April 27, 1926.

A. C. WOLKEN

FRUIT GATHERER

Filed Nov. 20, 1924

1,582,365

Alvin C. Wolken
Inventor

By Clarence A. O'Brien
Attorney

Patented Apr. 27, 1926.

1,582,365

UNITED STATES PATENT OFFICE.

ALVIN C. WOLKEN, OF LE GRAND, IOWA.

FRUIT GATHERER.

Application filed November 20, 1924. Serial No. 751,037.

*To all whom it may concern:*

Be it known that I, ALVIN C. WOLKEN, a citizen of the United States, residing at Le Grand, in the county of Marshall and State of Iowa, have invented certain new and useful Improvements in Fruit Gatherers, of which the following is a specification.

This invention relates to improvements in fruit gatherers and has for its principal object to provide a simple and efficient means whereby fruit, such as apples, pears, oranges or the like may be severed from the branches of a tree, and collected in a suitable bag.

Another important object of the invention is to provide a fruit gatherer which is adapted to be supported on the upper end of a pole, whereby a person standing on the ground may reach the fruit and remove the same from the trees in a simple and efficient manner.

A further object of the invention is to provide a fruit gatherer of the above mentioned character, which is simple in construction, inexpensive, strong and durable, and further well adapted for the purposes for which it is designated.

Other objects and advantages of this invention will become apparent during the course of the following description.

In the accompanying drawing, forming a part of this specification, and in which like numerals designate like parts throughout the same:

Figure 1:
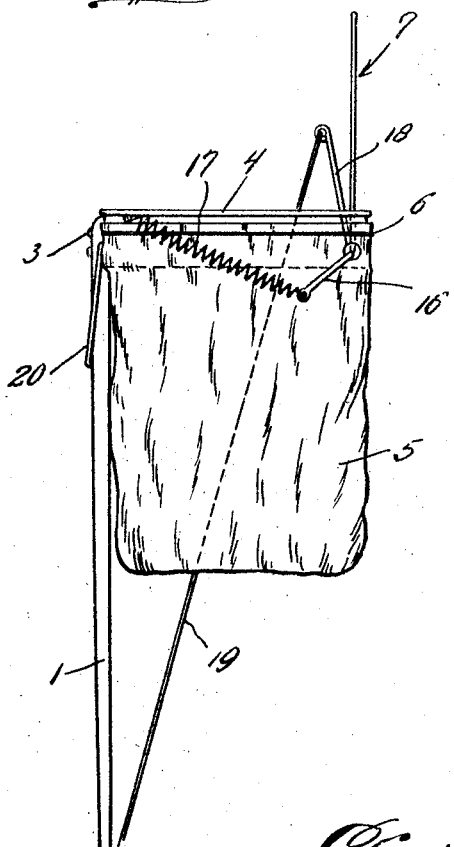
Figure 1 is a side elevation of the fruit gatherer embodying my invention.

In the drawing, wherein for the purpose of illustration is shown the preferred embodiment of my invention, the numeral 1 designates an elongated pole, and adapted to be secured on the upper end thereof is a substantially rectangular metallic frame 2, the same being secured to the pole 1, as at 3. The upper edge of the frame 2 is rolled, as illustrated at 4, so that the fruit will not be bruised by the upper edge of the frame, when the device is in use. A bag 5, in which the fruit which is to be gathered is collected, is secured around the frame 2, by means of the clamping wire 6, so that the bag may be readily removed from the frame, when filled, in the manner well known in the art.

Figure 3:
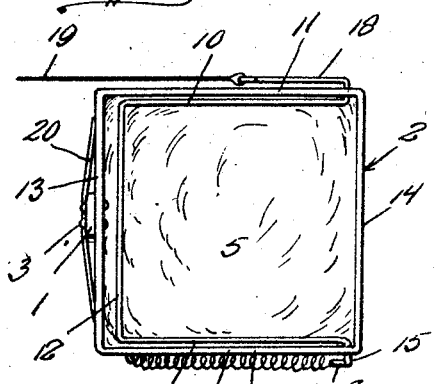
Figure 3 is a top plan view.

Cooperating with the frame 2 is a pivoted jaw, designated by the numeral 7. The jaw is formed of a single strand of wire and is bent into substantially U-shape, formation, in a manner as more clearly illustrated in Figure 3, whereby the same conforms with the shape of the frame 2. The arm 8 of the U-shaped jaw 7 is disposed adjacent the side 9 of the frame 2, while the other arm 10 of the U-shaped jaw is disposed adjacent the opposite side 11 of the frame. The base portion 12 of the U-shaped jaw 7 is adapted for cooperation with the side 13 of the frame 2, which is secured, at its intermediate portion, to the upper end of the supporting pole 1.

The free end of the arm 8 is disposed laterally through a suitable opening provided therefor in the side 9 of the frame 2 adjacent the side 14 of the frame, and the laterally extending portion 15 of the arm 8 terminates in a downwardly extending portion 16, the end of which is fastened to one end of a coil spring 17, the opposite end of the coil spring being fastened to the side 9 of the frame 2, adjacent the adjacent side 13. The free end of the opposite arm 10 of the U-shaped jaw 7 extends through a suitable opening provided therefor in the side 11 of the frame 2 adjacent the adjacent side 14, and terminates in an upwardly extending lever 18, in a manner as clearly illustrated in Figures 1 and 2 of the drawing. The lever 18 is furthermore disposed at an angle with respect to the plane in which are disposed the parallel arms of the U-shaped jaw 7 and leans toward the side 13. The lever is secured at its free end to an operating cable 19, the free end of the latter being within easy control of the person using the device.

Reinforcing means or braces, such as are shown at 20 are associated with the upper end of the pole 1 and the side 13 of the frame 2 which is fastened on the pole.

Figure 2:
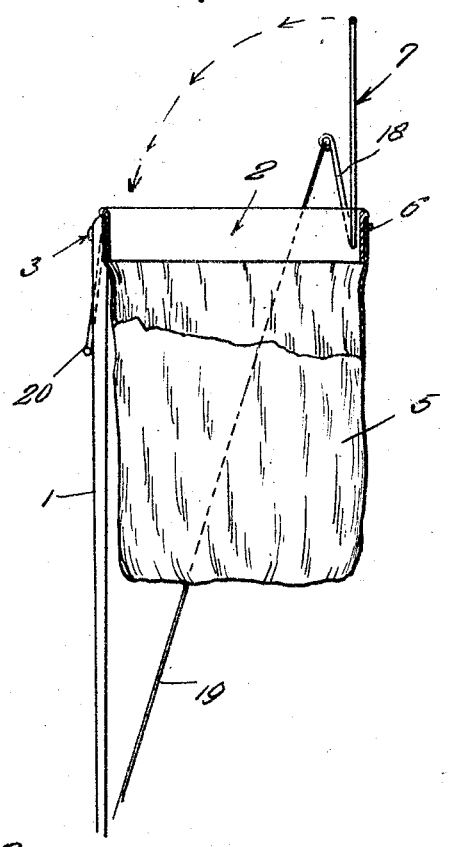
Figure 2 is a similar view, with parts shown in section.

Normally, the spring 17 holds the U-shaped jaw 7, in the position as shown in Figures 1 and 2 of the drawings, and by placing the frame over the fruit to be gathered and pulling on the cable 19, the jaw 7 will move downwardly in the direction of the arrows, within the frame 2, so that the base portion 12 thereof will cooperate with the side 13 of the frame 2 for holding the fruit so that it may be separated from its stem, causing the fruit to drop into the bag 5. By releasing the cable 19, the spring 17 will return the jaw 7 to its normal inoperative position and permit the device to again be positioned over another piece of fruit. When the bag 5 has been filled, the clamping wire 6 is removed, and the bag may be disengaged from the frame 2, whereupon the fruit gathered or collected in the bag is placed in a suitable receptacle, and the empty bag is again secured in position around the frame by a clamping wire 6.

It will thus be seen from the foregoing description that a fruit gatherer has been provided which will save considerable time and labor, and furthermore the parts will be so arranged as to render the operation of the device efficient and positive. By having the upper edge of the metallic frame rolled, the danger of bruising the fruit will be eliminated.

While I have shown the preferred embodiment of my invention, it is to be understood that various changes in the size, shape, and arrangement of parts may be resorted to, without departing from the spirit of the invention, and the scope of the appended claim.

Having thus described my invention, what I claim is:

In a fruit gatherer, a four sided frame, a pole fixed to one side of the frame, a U-shaped member having its ends disposed outwardly and journaled through the sides of the frame extending from the side to which is attached the pole, a crank formed on one end of the U-shaped member, a spring attached to the crank and to the frame for normally holding the U-shaped member in a raised position, a crank formed on the other end of the U-shaped member, and a cable attached to the end of the last mentioned crank so that said cable may be pulled to swing the crank and the U-shaped member down into the frame toward the side thereof fixed to the pole.

In testimony whereof I affix my signature.

ALVIN C. WOLKEN.